May 16, 1939.                    U. GUERRA                    2,158,500
                        MAGNETIC FIELD DIRECTION FINDER
                            Filed Feb. 3, 1937
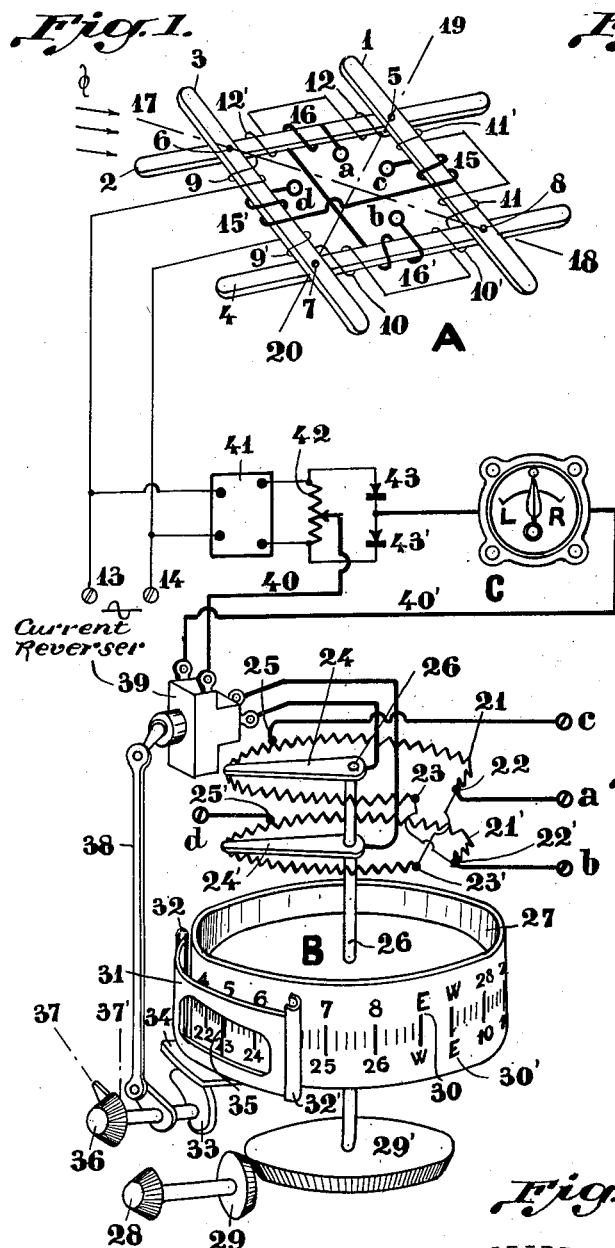
INVENTOR:
UGO GUERRA
BY Haseltine Lake & Co.
ATTORNEYS Patented May 16, 1939

2,158,500

UNITED STATES PATENT OFFICE 2,158,500

MAGNETIC FIELD DIRECTION FINDER

Ugo Guerra, Rome, Italy

Application February 3, 1937, Serial No. 123,811

3 Claims. (Cl. 33—204)

The present invention relates to improvements in electromagnetic compasses with earth induction, by means of which it is possible to obtain an induction compass with distance control and indications at distance, completely static in all its parts, apart from the index or indexes of its signalling instruments.

With this object in view a complex formed with two open magnetic circuits disposed at right angles to each other, is used as detecting element of the earth's magnetic field, each of said circuits comprising one or more coils in which currents are induced by the flux due to the earth's magnetic field, the necessary variation of said flux being obtained with the system of the static variation of the reluctance of the magnetic circuit caused by a similar variation of the permeability of this latter, by means of a variable flux which is independent of that of the earth.

Said electromagnetic complex is placed in a fixed position in the vehicle the course of which is to be determined, due care being taken that only the flux of the horizontal component of the earth field may act on it; the induced currents of the two pairs of windings coupled with the two magnetic circuits perpendicular to each other, are conveyed to a potentiometer provided with two slidable contacts connected to an indicating instrument having the zero mark in its centre, so as to annul in said contacts at any moment, by suitably displacing the said contacts, the current produced by the coils, so as to maintain on said zero mark the index of the instrument when the vehicle is moving on the predetermined course.

The invention relates also to the form of embodiment both of the electromagnetic complex and of the potentiometric device, adapted to confer to the compass a perfect stability and a great precision in the indication of the course.

The annexed drawing serves to illustrate the invention.

Fig. 1 shows schematically by way of example the general arrangement of a complete apparatus, in which A is the electromagnetic complex or responsive element of the compass, B the potentiometric device or course control, and C the instrument indicating the course deviations.

Figures 2 to 8 show various diagrams to illustrate the forms of current produced in the working of the instrument.

Fig. 9 shows a ring shaped bearing having a cut-out edge, serving to regulate the resistances of the potentiometer.

As shown in the drawing, the electromagnetic complex A is formed with two pairs 1—3 and 2—4 of small bars of magnetic material, made with iron-nickel alloy having a very high permeability, disposed perpendicularly to each other, so as to form a partially closed magnetic circuit 5—6—7—8 of quadrangular shape provided at the corners with outside projections designed to collect the flux of the earth magnetic field, and forming open magnetic circuits at the ends of said small bars. In the portion of the small bars comprised in the closed magnetic circuit, the windings 9, 9'; 10, 10'; 11, 11'; 12, 12' are applied, as shown in thin lines on the figure, which are electrically connected in series one with the other, in said windings circulating an alternating current or a pulsating direct current, supplied by the feeding circuit 13 and 14, and disposed so as to produce a closed flux in the closed magnetic circuit, having for example in a certain moment, the direction 5—6—7—8—5, and as such flux is variable in relation with the current supplied by the circuit 13—14, it will give rise to variations of permeability in each individual section 5—6; 6—7; 7—8; 8—5 in relation to the amplitude of the flux-permeability characteristic of the iron-nickel alloy containing a suitable amount of nickel; and in consequence thereto a variation of reluctance will be obtained in said sections, which will be the same for each section as they are connected in series in the magnetic circuit and being therefore traversed by an identical variable flux.

In the central portion of each small bar, disposed between the induction windings, shown in the figure with thin lines, an independent winding 15—15'—16—16' is provided, connected in series or in parallel with the corresponding winding mounted on the parallel small bar; two circuits a—b and c—d are thus obtained, in which the flux produced by the windings receiving current from the circuit 14—15 does not produce any current, as the position of the winding 15—15'—16—16' is symmetrical with respect to the others, and their connection in pairs is in opposition with respect to the closed flux produced by the windings shown with thin lines, and which in each pair of parallel small bars, has in one of these latter a contrary direction to that of the other.

Considering however the complex A as being placed in the flux $\phi$ of the earth magnetic field, the variation of reluctance in sections 5—6; 6—7; 7—8 and 8—5, will produce variations of the same flux in such sections, and as such flux is necessarily external to the complex, it will have, in the pairs of parallel small bars, the same direction, so that in the pairs 15—15' and 16—16' of windings, induced currents of double frequency will be obtained which will not be eliminated, so that on the leads of the circuits a—b and c—d, induced currents due exclusively to the variations imposed to the flux of the earth magnetic field, will pass through the small bars. In other words, currents will be obtained at the leads of circuits a—b and c—d, only when the complex of the small bars and the windings is plunged in an external magnetic flux, while the effect of the flux created by the windings shown in thin lines is only adapted to cause such periodical variations of reluctance of the magnetic circuit which are necessary to produce like variations of the intensity of the external flux passing through the small bars.

It must be observed that the induced currents in the windings 15—15'—16—16' also occur even when these latter are symmetrically disposed on the sections of the small bars 1—2—3—4 externally of the closed circuit 5—6—7—8, as they are produced by the variations of the external flux φ passing through the open magnetic circuits formed by the four small bars, owing to the variations of reluctance of the sections comprised in the closed magnetic circuit.

The ratio between the intensity of the currents produced by the circuits a—b and c—d, is a sinusoidal function of the ratio between the angles that the two pairs of parallel small bars form with respect to the direction of flux φ, so, that from the ratio of intensity of the two currents it is possible to ascertain immediately the orientation of the responsive complex in the earth magnetic field and consequently that of the vehicle on which it is mounted.

Figures 2 to 8 show the form and strength of currents produced in some cases with the device. Supposing the circuit 13—14 is fed with a sinusoidal alternating current having the form shown in Fig. 2, if the complex A is orientated in the earth magnetic field so that its direction lies, for example, parallel to the diagonal 17—18 of the rectangle 5—6—7—8, the induced currents in the pairs of windings 15—15' and 16—16', will have the same relative amplitude as shown in Figs. 3 and 4, but will have a frequency double than the current frequency in the circuit 13—14, as already mentioned. By disposing instead the complex A so that the small bars 2 and 4 may lie parallel to the direction of flux φ a current will be produced having its maximum amplitude in the windings 16—16' (Fig. 5) and zero current in the windings 15—15' (Fig. 6) the small bars relative to these latter lying in this case in the direction of the flux. The opposite effect is obtained when the small bars 1 and 3 are disposed in the direction of the flux of the earth magnetic field (Figs. 7 and 8).

It will be understood that the orientation of the complex A is obtained by orientating correspondingly in space the vehicle on which said complex is mounted rigidly, so that the control of the orientation of the complex and consequently that of the vehicle is obtained, by means of the indicator to the zero mark, at any distance from the complex itself, by means of a potentiometric circuit adapted to control from a distance the angles that the small bars will form with the direction of the flux of the earth magnetic field so as to obtain in the circuits a—b and c—d, currents which will neutralize themselves in said potentiometric device and consequently with no effect on the zero indicator.

The potentiometric control forming the course control, is designed so that it allows a great precision of orientation, and the possibility of measuring and prefixing even very small angles, while maintaining the size of said potentiometer and of the quadrant of the course indicator comparatively small.

As shown by way of example in Fig. 1, the potentiometer B comprises two ohmic circular resistances, which are not continuous, but which are each interrupted through a small space 22—23 and 22'—23', disposed one over the other, so that two parallel sliders 24 and 24', lying on the same axial plane, may slide on each of them, so that to each position of the slider on its relative resistance, corresponds a like position of the other slider on the other resistance, both geometrically and electrically.

The ends 22 and 23 of the resistance 21 are respectively connected with the ends 23' and 22' of the resistance 21', or vice versa, so that, proceeding in the same direction, each resistance may virtually form an extension of the other, without solution of the electric continuity; they being for example, similarly connected with the ends a and b of the circuits of the coils 16 and 16' of the complex A, while the electrical and geometrical central point of each resistance 25 and 25', is connected to one of the leads c and d of the circuit of the coils 15 and 15'.

A course quadrant 27 is integral with the shaft 26 of the sliders 24 and 24', the whole being adapted to rotate by means of a control 28 and a pair of gears 29 and 29', for the predetermination of the course; said quadrant being graduated throughout its circumference, except in a short space, corresponding both in position and angular amplitude, to one of the sections 22—23 or 22'—23' in which the resistances are interrupted. The arrangement above described of these latter, allows the direction to be developed through a range of 360°, of the course on two scales of 180° each, disposed one above the other, each comprising the whole circumference of the quadrant, save the short space above mentioned, said two scales being so disposed that, when proceding in the same direction, one of them forms the continuation of the other. The reading of each scale is made in correspondence to the index 35 placed in the centre of a small window provided in the frame 31, the upper and lower edges of which are sufficiently high, so that by sliding said frame on the guides 32 and 32', it is possible to see only one of the scales through the window, as the other scale remains covered.

The above described substitution of the scales may be accomplished by means of the control 36, acting on a cam 33 on which rests an abutment 34 provided on the lower edge of frame 31; said control 36 being adapted to assume the position 37 and 37' each of which corresponds to one of the scales; said control 36 operating at the same time, through a lever 38, an electric current reverser 39. This latter reverses instantaneously the direction of the alternating current circulating in the circuit of the two sliders 24 and 24' sliding on the resistances 25 and 25', so that the reading of a given scale on quadrant 27, corresponds to a given intsantaneous direction of the current in said circuit. This latter, by means of the connections 40 and 40' leading from the current reverser 39, feeds the course indicator C, consisting of a continuous current instrument with the zero mark placed in the centre, through a device adapted to cause the current circulating in the circuit to be unidirectional and also to cause instrument C to register the direction of the displacement of element A in the earth magnetic field. This is obtained by means of two static rectifiers 43 and 43' for both half waves, which are activated by the current feeding the circuit 13 and 14, through the central connection 42 which may be a transformer or a resistance.

As the circuit of the sliders 24 and 24' is traversed by the current delivered by the induced coils of the responsive element A, in which, as already mentioned, a current of double the frequency as that of the feed current 13—14 is induced, in order to obtain the maximum sensitivity of the indications, it is preferable, (but not necessary) to interpose between the circuit 13—14 and the connection 42 a transformer 41 for doubling the frequency, in order to confer to the current of excitation of the rectifiers 43 and 43' the same frequency of the current arriving from the circuit 24 and 24'.

The operation of the compass device is evident from the foregoing description. In fact, to each position which complex A may assume in space through an angular displacement of 180°, there is a corresponding similar position of sliders 24 and 24' on the potentiometric resistances 21 and 21', which in circuit 40—40' neutralizes the effect of the currents circulating in the resistances themselves, coming from the pairs of windings leading to a—b and c—d. There will be no current in circuit 40—40' when the ratio between the angles, which for a given position will be formed by the pairs of bars 1—3 and 2—4 (or vice versa) with the flux φ of the earth magnetic field, will be equal to the ratio between the two branches of resistances comprised between the sliders, the central points 25—25' and the leads 23—23' or 22—22'. The reversal through 180° of the responsive element A with respect to φ, will similarly give rise to no current in circuit 40—40', the position of the sliders with respect to the resistances remaining unaltered, as the ratio between the relative angles between the pairs of the parallel cores and flux φ will remain unaltered. There will be a reversion however of the relative increases and decreases of the currents induced in the two pairs of windings corresponding to the small bars, so that there will be a change of phase between the current of the circuit of the sliders 24—24' and the feeding current of the central connection 42. In such case the index of instrument C would be displaced in direction opposite to the real direction of displacement of element A, which would cause the reading on the visible scale through the window in the frame 31, to show an inverted course through 180° with respect to the real course. Control 36 operating the reversion of the current in circuit 40—41, and consequently the reversion of the scale, will cause the reading to reassume its true value.

As aforesaid, the ratio between the currents in circuits a—b and c—d, is a sinusoidal function of the ratio between the relative angles the pairs of parallel bars form with respect to the direction of flux φ, it is necessary that the resistances 21 and 21' must not be linear but they should have sinusoidal shape so that the scale markings on the quadrant may be uniformly spaced.

This can be obtained, as shown by way of example in Fig. 9, by providing each resistance with a support shaped as a cylinder or ring 44, the edge 45 of which has a suitable sinusoidal outline, and when two such rings are used, it is obvious that both parallel bars will follow the same movement, due to the shape of the edge 45 on each ring causing such movement.

The potentiometric device hereinbefore described for obtaining the maximum precision of the course with the smallest dimensions, and has the advantage of providing for the reversal of the course by simply acting on the control 36; it must however be understood that element A forming the sensitive part of the compass may also be connected to a different type of potentiometer.

I claim:

1. Magnetic field direction finder of the type comprising in combination, a core system of variable permeability and a current indicating device connected with said core system, said system forming at least two pairs of magnetic circuits, a first pair of windings mounted on said system for carrying an alternating current, a second pair of windings on said system for exclusively carrying the current induced by the variation of flux of the magnetic field due to the variations of reluctance of the magnetic circuits, a potentiometric device comprising slidable contacts to which the leads of the second pair of the aforesaid windings on said system are directly connected, said current indicating device being electrically connected to said potentiometric device and controlled thereby for indicating zero when the core system is orientated in respect to the magnetic field to a position corresponding to the position of the slidable contacts in the potentiometric device.

2. A magnetic field direction finder according to claim 1, wherein the potentiometric device comprises two superposed discontinuous, spaced ring-shaped resistances, a supporting member carrying the slidable contacts, and two coincidental graduated scales supported by said supporting member and running in opposite directions, so that the total variation produced by the rotation through 360° of said system includes two corresponding complete paths on the circumference of said resistances on which the contacts slide, a current reverser reversing the current circulating in the circuit of the two sliding contacts upon each of said paths being completed, so as to produce both a substantial reduction in size of the potentiometer device and increase in the precision of the reading obtained.

3. A magnetic field direction finder according to claim 1, wherein the potentiometer device is provided with two coincidental graduated circular scales running in opposite directions, a current reverser, index means for said scales comprising a member movable transversely of said scales and having a window through which but one scale may be viewed at a time, means mechanically connecting said current reverser and said index means, so that, when said current reverser is actuated in order to change the direction of the current, the position of said window is also positively changed in respect to the two scales so as to cause the reading of the graduated scale to correspond to the position of the current reverser.

UGO GUERRA.